United States Patent [19]

Aoyagi et al.

[11] Patent Number: 4,577,934
[45] Date of Patent: Mar. 25, 1986

[54] MECHANICAL MOUNTING FOR A ZOOM LENS

[75] Inventors: Masao Aoyagi, Kanagawa; Kazufumi Kobayashi; Keiichi Yasuda, both of Tokyo, all of Japan

[73] Assignee: Canon Kabushiki Kaisha, Tokyo, Japan

[21] Appl. No.: 703,737

[22] Filed: Feb. 21, 1985

[30] Foreign Application Priority Data

Feb. 21, 1984 [JP] Japan ............................. 59-24078[U]

[51] Int. Cl.⁴ ............................................... G02B 7/10
[52] U.S. Cl. ...................................... 350/430; 350/429
[58] Field of Search ............................. 350/429, 430

[56] References Cited

U.S. PATENT DOCUMENTS

| 3,731,987 | 5/1973 | Iida et al. | 350/430 |
| 4,439,019 | 3/1984 | Muryoi | 350/430 |
| 4,448,496 | 5/1984 | Isobe et al. | 350/430 |

Primary Examiner—John K. Corbin
Assistant Examiner—Loha Ben
Attorney, Agent, or Firm—Toren, McGeady, Stanger, Goldberg & Kiel

[57] ABSTRACT

In the disclosed mechanical mounting for a zoom lens, a body tube and a single actuator barrel are provided with an intermediate sleeve therebetween, and a variator lens cell and a rotary ring are arranged inside the body tube, whereby a driving torque for the variator lens cell is transmitted from the intermediate sleeve to the rotary ring.

1 Claim, 3 Drawing Figures

MECHANICAL MOUNTING FOR A ZOOM LENS

BACKGROUND OF THE INVENTION

1. Field of the Invention

This invention relates to zoom lens mountings, and more particularly to a driving torque transmitting mechanism for the variator lens cell in the zoom lens mounting having a single actuator member for focusing and zooming.

2. Description of the Prior Art

The mechanical mountings for zoom lenses of which the focusing and zooming are performed by only one actuator member are known, for example, in U.S. Pat. No. 4,448,496 (Japanese Laid-Open Patent Application No. SHO 56-54408). The mechanical mounting disclosed in the above-identified patent is adapted to be used with the 4-component zoom lens including a focusing lens component, a variator, a compensator and a relay lens.

In this type of mounting, when to perform zooming, the single actuator member is axially moved. The mechanism for transmitting the driving power from the actuator member to differential axial movement of the variator and compensator has been constructed in such a way that the cam followers radially extending outwardly of their lens cells fitted in the body tube take their places at the cross points of the camming slots provided through the wall of the body tube with the camming grooves or slots formed in the inner surface of an axially slidable sleeve fitted on the outer diameter of the body tube and arranged to move as a unit with the actuator ring when zooming. As the slope of each of the camming slots of the body tube and the outer sleeve varies with the focal length of the entire system, therefore, when the angle the two slopes of the paired camming slots make becomes smaller, the required value of the driving power for axially moving each of the lens cells rapidly increases with increase in the stress to the operating mechanism. If the lens cells are forced to move, they are inclined with the optical axis, so that the imaging performance is worsened.

SUMMARY OF THE INVENTION

An object of the present invention is to eliminate the above-described drawback, and to provide a mechanical mounting for zoom lenses of improved actuating feeling with the possibility of achieving the stabilization of the optical imaging performance.

The mechanical mounting of the invention is adapted particularly for the 2-component and 3-component zoom lenses of which the first lens component has functions of focusing and of compensating for the image shift due to zooming, the second lens component has a function of varying the magnification power, or is a variator, and the third lens component is a relay lens, or of which the first and second lens components are equivalent to the above-described first and second ones respectively, with the third one omitted.

Another object of the present invention is to provide a zoom lens mounting with a rotary ring through which the driving power of the actuator member is transmitted to movement of the variator lens cell, thereby it being made possible to smoothly move the variator over the entire zooming range with its operating mechanism of low torque.

The use of such a transmitting mechanism in the zoom lens mounting provides another possibility of shortening the length of the complete lens mounting in the longitudinal direction. The prior known mounting mechanism for the 3-component or 4-component zoom lens has features that the variator and compensator lens cells are fitted in the body tube, and that one of the cells is provided with cam-pin drive connection means for transmitting axial movement of the intermediate sleeve between the actuator member and the body tube to rotative movement thereof, and the other cell is provided with means for transmitting rotative movement of the first-named cell to axial movement thereof. The above-described prior known mounting mechanism has, therefore, a problem that because the variator lens cell and the compensator lens cell are arranged axially in series inside the body tube, in order to ensure the optical precision accuracy against accidental inclination of each of the lens cells with the optical axis, the length of the contacting portion of the lens cell with the body tube must be increased, and, therefore, the axial length of the mounting is caused to increase.

According to the invention, therefore, as zooming is performed by moving two lens components, say, the first and second components counting from the front, axially in differential relation, the number of lens cells movably fitted in the body tube is limited to only one, and a rotary ring is used for constituting part of a drive connection, thereby giving an advantage of shortening the length of the contacting portion of the lens cell with the body tube, and, as a result, obtaining a lens barrel of reduced physical length.

BRIEF DESCRIPTION OF THE DRAWINGS

FIGS. 2 and 3 are expanded views of the body tube and intermediate sleeve of FIG. 1 where the behavior of the cam follower pins relative to the camming slots is shown in the wide angle and telephoto positions, respectively.

DETAILED DESCRIPTION OF THE PREFERRED EMBODIMENT

Figure 1:
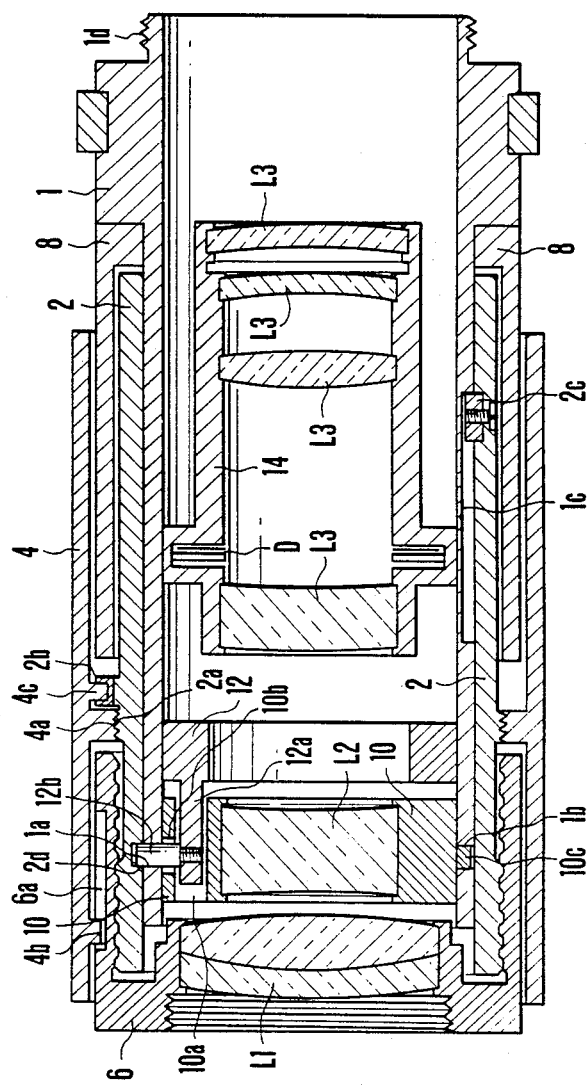
FIGS. 1 to 3 illustrate an embodiment of a zoom lens mounting according to the present invention, with FIG. 1 being a longitudinal section view.
Figure 2:
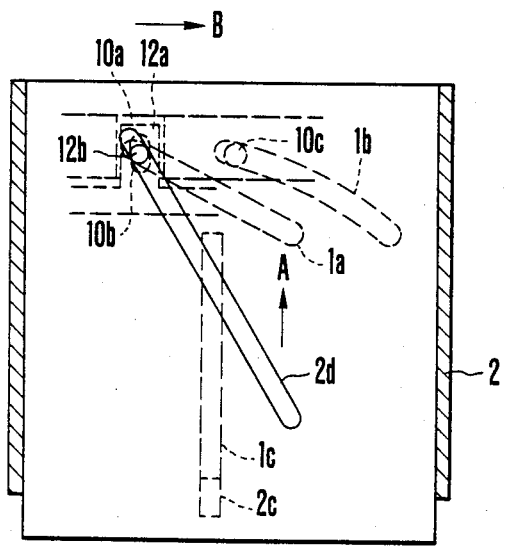
Figure 3:
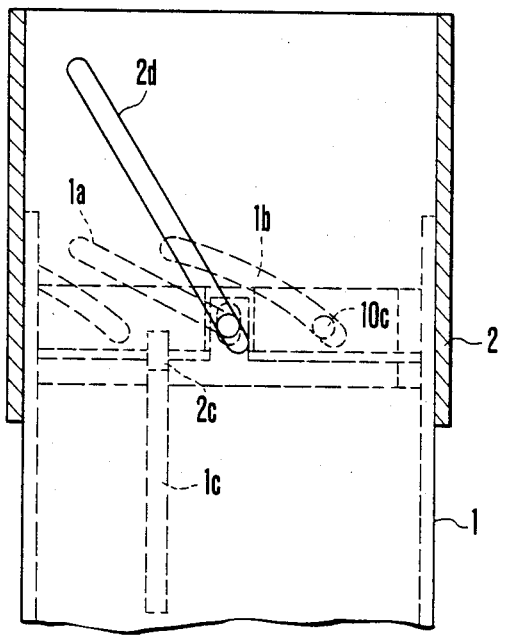

The present invention is next described in connection with an embodiment thereof by reference to FIGS. 1 to 3. A body tube 1 has first and second camming slots 1a and 1b and an axially elongated slot 1c. At the rear end of the body tube 1 there is shown a screw-threaded portion 1d for coupling to a camera body (not shown). An intermediate sleeve 2 is fitted on the outer diameter of the body tube 1, and is drivenly connected to a single actuator member 4 by respective screw-threaded portions 2a and 4a of very short pitch engaging with each other.

A first lens cell 6 contains a first lens component L1 for focusing and for image shift compensation and is mounted on the intermediate sleeve 2 by helicoid means. A drive connection pin 4b extends radially inwardly of the actuator member 4 into an axially elongated groove 6a formed in the outer surface of the first lens cell 6. A scale ring 8 is fixedly mounted on the body tube 1. When focusing, rotation of the actuator member 4 is limited by a stopper 4c on an abutment 2b. A longitudinal motion control key 2c of the intermediate sleeve 2 engages in the groove 1c of the body tube 1.

A second lens cell 10 contains a variator lens L2 and is fitted in the inner diameter of the body tube 1. A rotary ring 12 is fitted in the inner diameter of body tube 1 and is arranged behind the second lens cell 10 in series relation. This rotary ring 12 has an arm 12a extending axially forwardly into a fitted groove 10a formed in the second lens cell 10. A cam follower pin 12b extends radially outwardly of the arm 12a through an axially elongated penetration hole 10b formed in the second lens cell 10 and the camming slot 1a formed in the body tube 1 into a camming groove 2d of the intermediate sleeve 2. Another cam follower pin 10c is fixedly mounted on the second lens cell 10 and engages in the camming slot 1b of the body tube 1.

D denotes a diaphragm device mounted within a third lens cell 14 which contains a relay lens group L3.

The operation of the lens mounting of such construction is as follows: When the actuator member 4 is turned about the optical axis, the first lens cell 6 is driven by the connection of the pin 4b with the groove 6a to move axially so that focusing is performed by the first lens L1.

When zooming, the actuator member 4 is moved axially, and thereby the intermediate sleeve 2 and the first lens cell 6 are moved as a unit, while axial movement of the intermediate sleeve 2 is transmitted through the connection of the pin 12b with the camming slots 2d and 1a to rotative movement of the rotary ring 12. The rotative movement of the rotary ring 12 is then further transmitted through the connection of the pin 12b with the penetration hole 10b and the connection of the pin 10c with the camming slot 1b to rotative and axial movement of the second lens cell 10.

When zooming, therefore, axial movement of the actuator member 4 causes axial movement of the compensator lens L1 at the same speed and also axial movement of the variator lens L2 at a differing speed depending upon variation of the lead of the camming slot 1b. Thus, the first lens L1 and the second lens L2 are moved axially in differential relation to vary the focal length of the entire system, while maintaining the constant position of the image plane.

As has been described above, according to the present invention, all what lens cell is axially movably fitted in the inner diameter of the body tube 1 is only the second lens cell 10 for the variator lens L2, and the rotary ring 12 for transmitting axial movement of the intermediate sleeve 2 to rotative movement thereof is controlled by movement of the cross point of the camming slots 1a and 2d of loose inclination angle. Therefore, the lens components movable for zooming can be operated smoothly by a relatively low torque.

Further, the rotary ring 12 functions only to transmit the driving torque to the second lens cell 10 so that there is no need for taking into consideration the accidental inclination of the rotary ring 12 with the optical axis. Therefore, the length of the contacting portion of the rotary ring 12 with the body tube 1 may be short thereby it being made possible to shorten the body tube 1 in the longitudinal direction.

What is claimed is:

1. A mechanical mounting for a zoom lens comprising:
   (a) a body tube;
   (b) a single actuator member;
   (c) an intermediate sleeve arranged between said body tube and said single actuator member, said intermediate sleeve moving axially as a unit with said actuator member and rotating relative to said actuator member;
   (d) a variator lens cell arranged inside said body tube, said lens cell having a groove and a penetration hole;
   (e) a rotary ring arranged inside said body tube, said rotary ring having an armed portion in engagement with said groove of said lens cell;
   (f) a connection pin engaging with said armed portion, said connection pin passing through said penetration hole of said lens cell to engage with said body tube and said intermediate sleeve, whereby axial movement of said single actuator member gives rotative movement to said lens cell through said connection pin and said rotary ring; and
   (g) an engaging member and a camming groove arranged between said lens cell and said body tube, whereby the rotative movement of said lens cell is converted to an axial movement.

* * * * *